United States Patent
Huang et al.

(10) Patent No.: US 7,695,874 B2
(45) Date of Patent: Apr. 13, 2010

(54) COLOR FILTER AND FABRICATION METHOD THEREOF

(75) Inventors: Yen-Heng Huang, Taipei County (TW); Yu-Wei Liu, Taipei County (TW); Yu-Hsin Ting, Kaohsiung County (TW); Kuo-Yu Huang, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 909 days.

(21) Appl. No.: 11/426,388

(22) Filed: Jun. 26, 2006

(65) Prior Publication Data

US 2007/0148563 A1    Jun. 28, 2007

(30) Foreign Application Priority Data

Dec. 26, 2005   (TW) ................ 94146502 A (51) Int. Cl.
  *G02B 5/20*   (2006.01)
  *G02F 1/1335*   (2006.01)
(52) U.S. Cl. .......................................... 430/7
(58) Field of Classification Search ............ None
  See application file for complete search history.

(56) References Cited

U.S. PATENT DOCUMENTS

| | | | |
|---|---|---|---|
| 6,099,993 A * | 8/2000 | Kim et al. ............ | 430/7 |
| 2005/0140857 A1 | 6/2005 | Kim | |

FOREIGN PATENT DOCUMENTS

| | | | |
|---|---|---|---|
| CN | 2189321 | | 2/1995 |
| CN | 1134699 | | 1/2004 |
| CN | 1576990 | | 2/2005 |
| CN | 1668964 | | 9/2005 |
| JP | 4-255803 | A * | 9/1992 |
| JP | 5-157907 | A * | 6/1993 |
| JP | 5-241139 | A * | 9/1993 |
| JP | 1062771 | | 3/1998 |

OTHER PUBLICATIONS

Computer-generated translation of JP 10-062771 (Mar. 1998).*
Computer-generated translation of JP 5-157907 (Jun. 1993).*
Computer-generated translation of JP 5-241139 (Sep. 1993).*
Abstract of JP 4-255803 (Sep. 1992).*

* cited by examiner

*Primary Examiner*—John A. McPherson
(74) *Attorney, Agent, or Firm*—Thomas, Kayden, Horstemeyer & Risley (57) ABSTRACT

A color filter and a method for fabricating the same. At least one conductive film is provided above a light shielding layer between R/G/B color filter units. The conductive film is electrically connected to an electrode layer, thereby reducing the resistance thereof.

2 Claims, 11 Drawing Sheets

COLOR FILTER AND FABRICATION METHOD THEREOF

This application claims the benefit of Taiwan Patent Application Ser. No. 94146502, filed Dec. 26, 2005, the subject matter of which is incorporated herein by reference.

BACKGROUND OF THE INVENTION

1. Field of the Invention

The invention relates to a color filter, and in particular to a color filter having at least one conductive layer over a light shielding layer and fabrication method thereof.

2. Description of the Related Art

Figure 1:
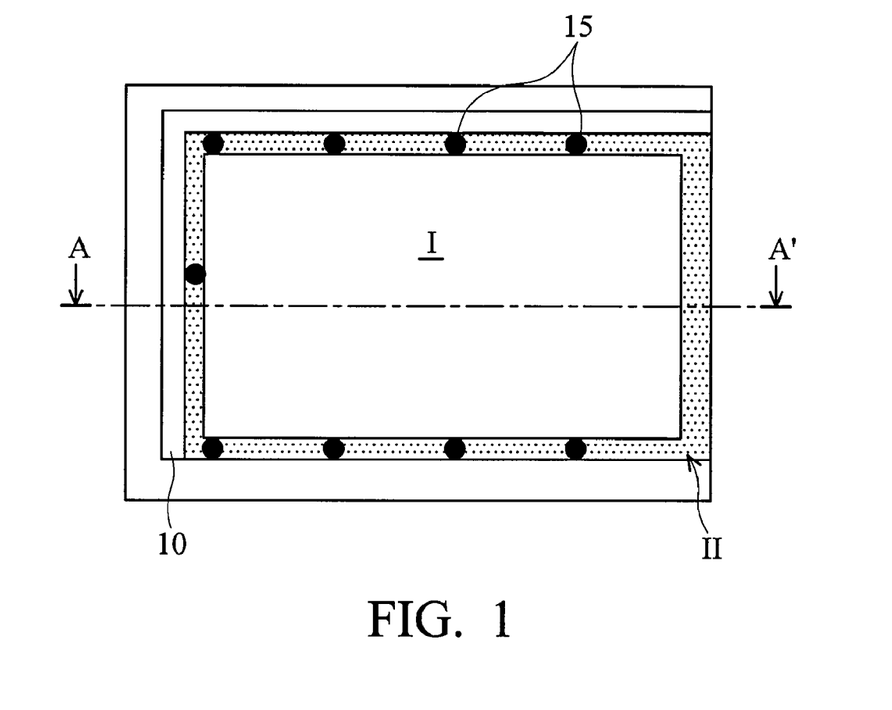
FIG. 1 is a schematic plan view of a conventional color filter.
Figure 1A:
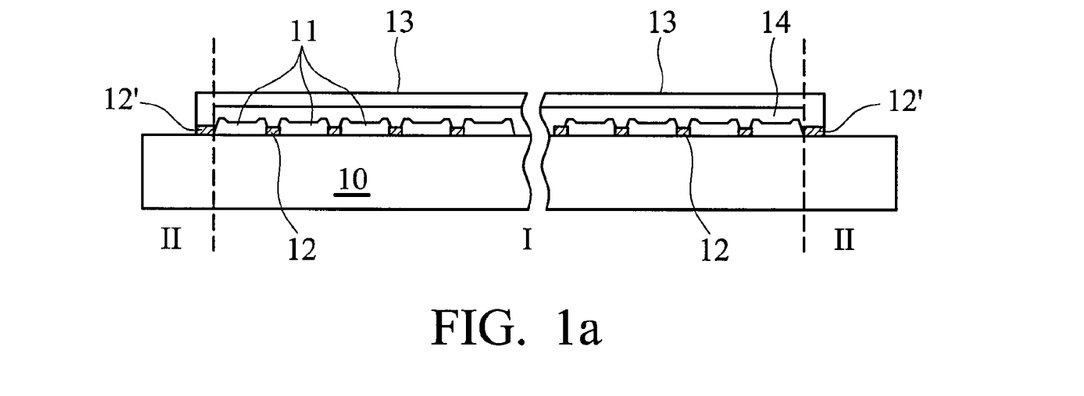
FIG. 1a is a schematic cross section of a conventional color filter taken along line A-A' of FIG. 1.

FIG. 1 is a plan view of a conventional color filter. FIG. 1a is a cross section taken along line A-A' of FIG. 1, wherein the conventional color filter includes a display area I and a non-display area II. The display area I comprises a substrate 10, a plurality of R/G/B color filter units 11, a light shielding layer 12 in the display area I, a planarization layer 14, and an electrode layer 13. The electrode layer 13 can be ITO or any other transparent conductive oxide (TCO) such as AZO or the like, for example. The non-display area II also comprises a light shielding layer 12'. As panel size increases, the voltage level decays with the increased conductive distance, causing insufficient area voltage.

Figure 2:
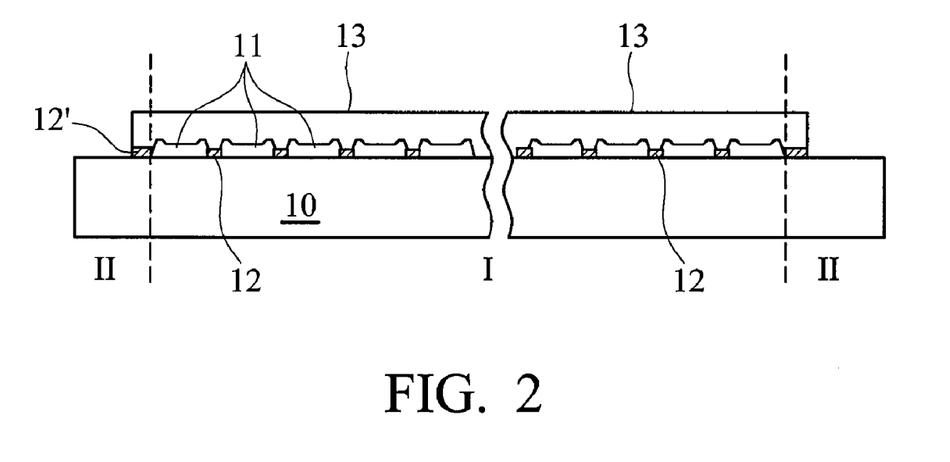
FIG. 2 is a schematic cross section of another conventional color filter including a planarization layer.

FIG. 2 is a cross section of another conventional color filter, including a substrate 10, a plurality of R/G/B color filter units 11, a light shielding layer 12 in the display area I, and an electrode layer 13. The electrode layer 13 can be ITO or any other transparent conductive oxide (TCO) such as AZO or the like, for example. FIG. 2 shown similar problems to FIG. 1a. As panel size increases, the voltage level decays with the increased conductive distance, causing insufficient area voltage.

In addition, the light shielding layer 12' in the peripheral non-display area II of the conventional color filters of FIG. 1a and FIG. 2, further comprises Ag transfer pads 15 as shown in FIG. 1. The signal between the transfer pads (for example, Ag) 15 is transmitted only by the electrode layer 13. As panel size increases, the voltage level between the transfer pads (for example, Ag) 15 decays with the increased conductive distance.

BRIEF SUMMARY OF THE INVENTION

The invention provides one or more conductive layers over a light shielding layer between R/G/B color filter units. The conductive layer is electrically connected with an electrode layer, and may be in the form of parallel strips. Parallel connection resistance can reduce the conductive resistance thereof.

According to an embodiment of the invention, a color filter comprises a substrate having a display area and a non-display area, a light shielding layer on the substrate, separating the display area into a plurality of sub-pixels, a plurality of color filter units on each of the plurality of sub-pixels on the substrate, a conductive layer overlying the light shielding layer, and an electrode layer overlying the substrate and electrically connected to the conductive layer. The method for fabricating the color filter comprises providing a substrate, forming a light shielding layer on the substrate to separate the display area into a plurality of sub-pixels, forming a plurality of color filter units on the sub-pixels, forming a conductive layer overlying the light shielding layer, and forming an electrode layer overlying the color filter units and the conductive layer and electrically connected to the conductive layer.

The invention provides one or more conductive layers overlying the light shielding layer at a periphery of the display area of the color filter(non-display area II), and electrically connects the conductive layer to the electrode layer to form a parallel structure, with parallel connection resistance reducing the conductive resistance thereof. In addition to the advantages described, conventional number of transfer pads (for example, Ag) is reduced for costs lowering and tact time improving.

Therefore, according to another embodiment of the invention, a color filter comprises a substrate having a display area and a non-display area, a light shielding layer on the substrate, a conductive layer overlying the light shielding layer of the non-display area near a periphery of the display area, and an electrode layer overlying the substrate and the color filter units and electrically connecting to the conductive layer. The method for fabricating the color filter comprises providing a substrate with a display area and a non-display area, forming a light shielding layer on the substrate, forming a conductive layer overlying the light shielding layer of the non-display area, and forming an electrode layer overlying the substrate and electrically connecting to the conductive layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

First Embodiment

As shown in FIGS. 3a-3d, the cross sections show fabrication steps of a color filter according to an embodiment of the invention.

Figure 3A:
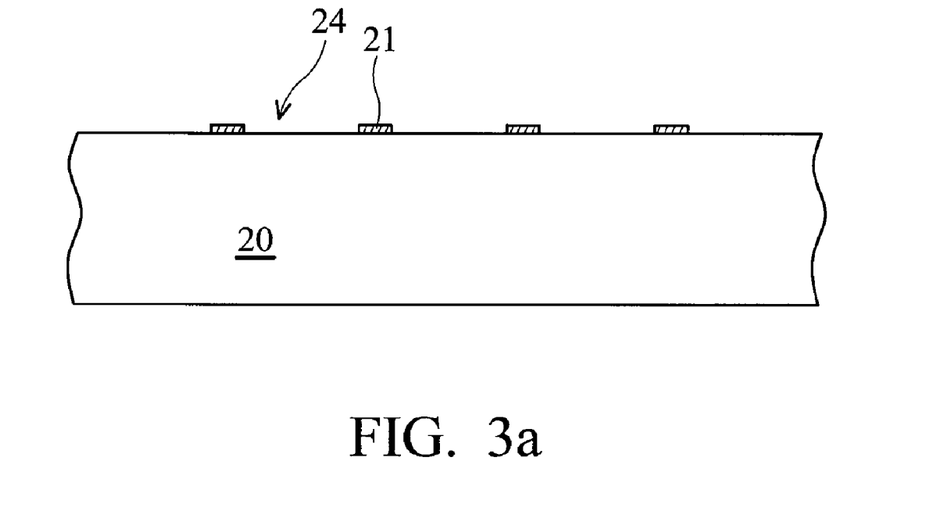
FIG. 3a-3d are schematic cross sections showing fabrication steps of a color filter according to a first embodiment of the present invention.

As shown in FIG. 3a, the invention provides a substrate 20 such as a plastic or glass substrate, a light shielding layer 21 is formed on the substrate 20, separating a display area into a plurality of sub-pixels 24. The material of the light shielding layer 21 can be black resin or black acrylic. The light shielding layer 21 is formed by photolithography and etching, transer printing, reverse printing, inkjet printing or Du Pont Donor film laser printing.

Figure 3B:
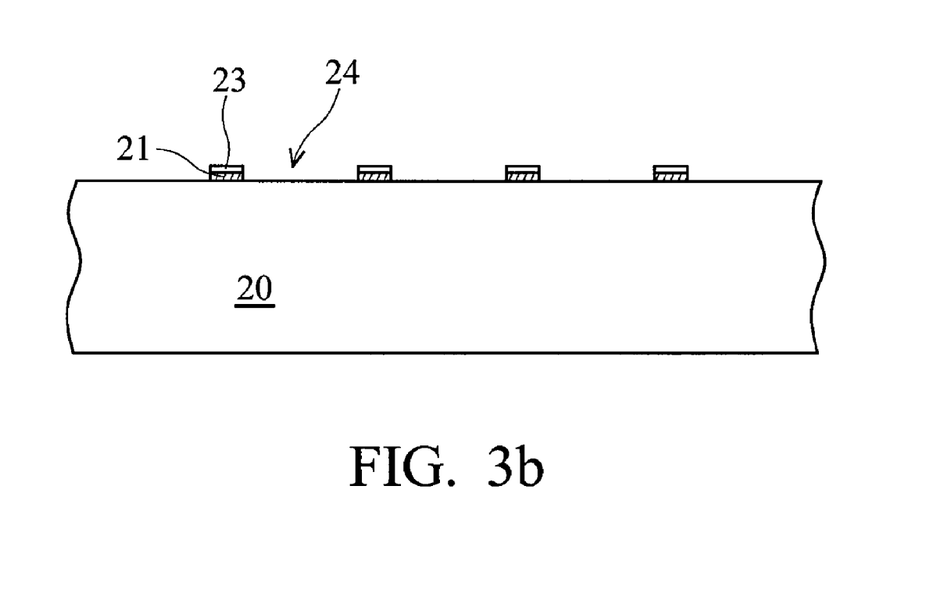

As shown in FIG. 3b, one or more conductive layers are deposited by sputtering, evaporation, electroless plating, and then into a matrix array of the conductive layer 23 by photolithography and etching with a mask. The mask can form the light shielding layer 21, or a maskless technique such as laser writing, EUV writing, Electron-beam or Ion-beam can form the matrix array of conductive layer 23. A new mask can also form a plurality of strips of the conductive layer 23.

Figure 3C:
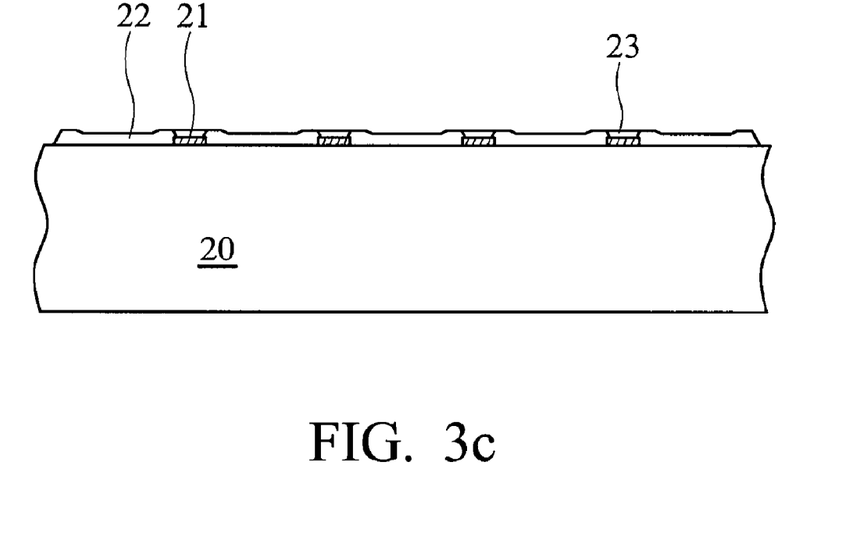
Figure 3D:
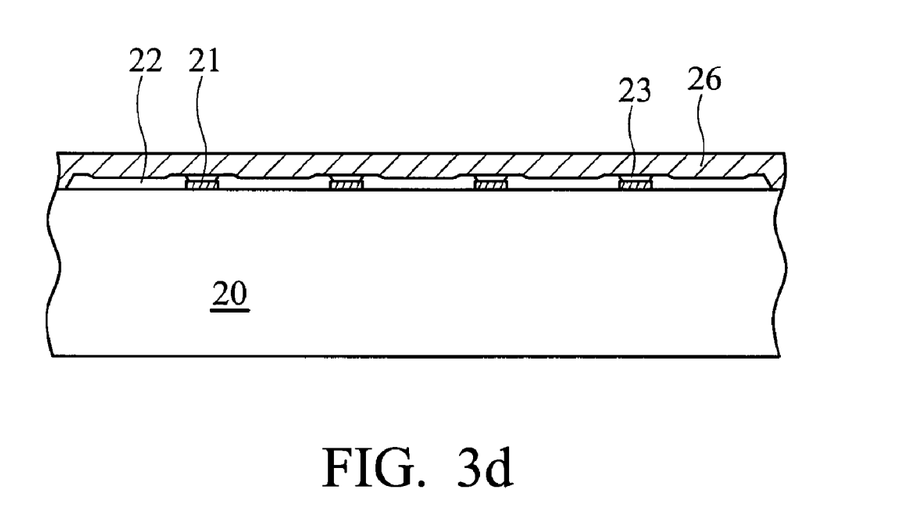

As shown in FIG. 3c, the R/G/B color filter units 22 are formed on the sub-pixels 24 between the light shielding layers 21 by photolithography and etching, transer printing, reverse printing, or inkjet printing. As shown in FIG. 3d, an electrode layer 26 is formed overlying the substrate 20 to cover all of the color filter units 22 and conductive layer 23 by sputtering or the like. The material of the electrode layer 26 can be ITO, ZnO or other metal doped in ZnO such as ZnO:Sn, ZnO:V, ZnO:Co, ZnO:Al, ZnO:Ga, ZnO:Ti or ZnO:In. The conductive layer 23 can be Ag, Mo, Ti, Al, Cu, Cr, Pt, Mo/Al/Mo, Ti/Al/Ti or Al/Nb.

In the above embodiment, formation of the light shielding layer 21 and the conductive layer 23 precedes formation of the R/G/B color filter units 22. Those skilled in the art will understand that fabrication of the color filter can also utilize a formation of R/G/B color filter units 22 before forming the conductive layer 23, the sequence of forming the R/G/B color filter units 22 and the conductive layer 23 does not affect the fabrication of the color filter.

After depositing the conductive layer 23, the same mask of the light shielding layer can be used to define a matrix array of the conductive layer 23, or a new mask or maskless technique such as laser writing, EUV writing, Electron-beam or Ion-beam can be used to define a plurality of strips of the conductive layer 23. As shown in FIG. 3d, an electrode layer 26 is formed overlying the substrate 20 by sputtering or the like.

Because the resistance is reduced efficiently, the structure of the invention allows lower material costs for electrode layer 26 by using materials such as ZnO:Sn, ZnO:V, ZnO:Co, ZnO:Al, ZnO:Ga, ZnO:Ti, ZnO:In or the like, electrode layer 26 is as thin as about 400~1500 Å, reduced voltage level decay despite increased conductive distance, enhanced transmission of the panel with thinner electrode layer.

Alternatively, the matrix array or parallel strips of conductive layer 23 can be directly formed on the light shielding layer 21 by electroless plating. Metal matrix array or parallel strips of conductive layer 23 can be printed on the light shielding layer 21 by inkjet printing. Electroless plating and inkjet printing omit the need for the mask and reduce costs.

Second Embodiment

Figure 4A:
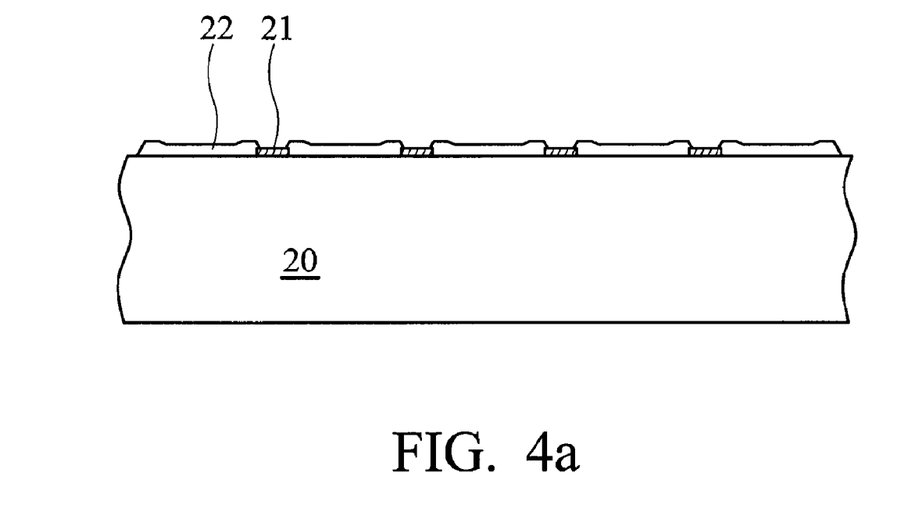
FIG. 4a is a schematic cross section showing formation of a plurality of R/G/B color filter units of a color filter according to a second embodiment of the present invention.

Here, unlike the first embodiment, formation of planarization layer 25 precedes formation of electrode layer 26. As shown in FIG. 4a, the light shielding layer 21 and the color filter units 22 are formed first according to the method of the first embodiment.

Figure 4B:
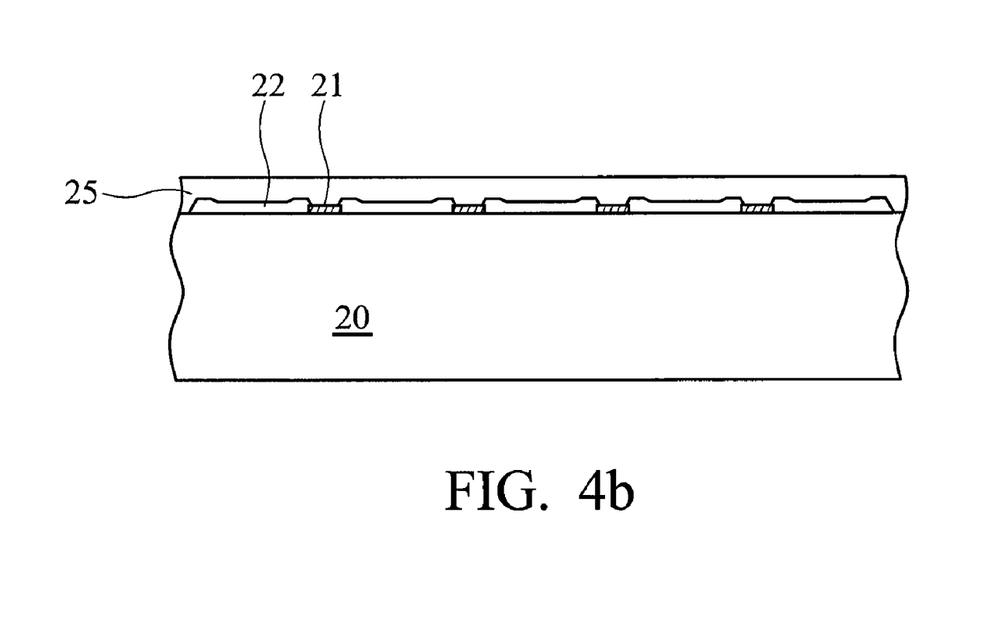
FIG. 4b is a schematic cross section showing formation of a planarization layer of a color filter according to a second embodiment of the present invention.
Figure 4C:
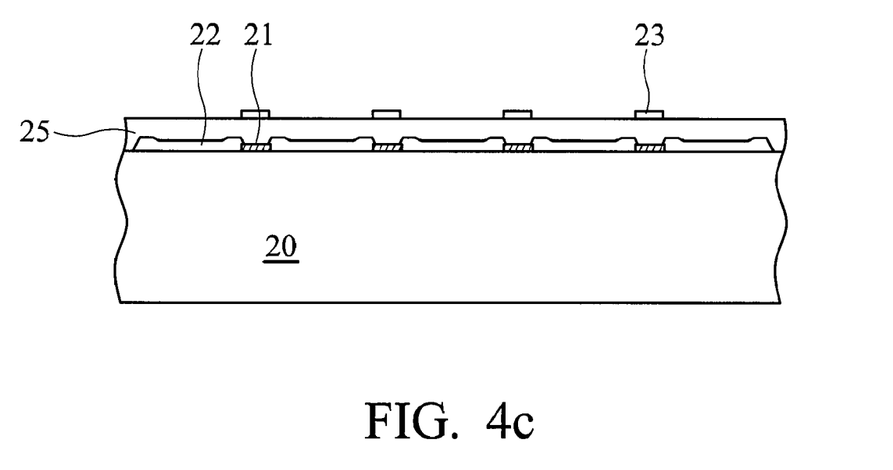
FIG. 4c is a schematic cross section showing formation of a conductive layer of a color filter according to a second embodiment of the present invention.
Figure 4D:
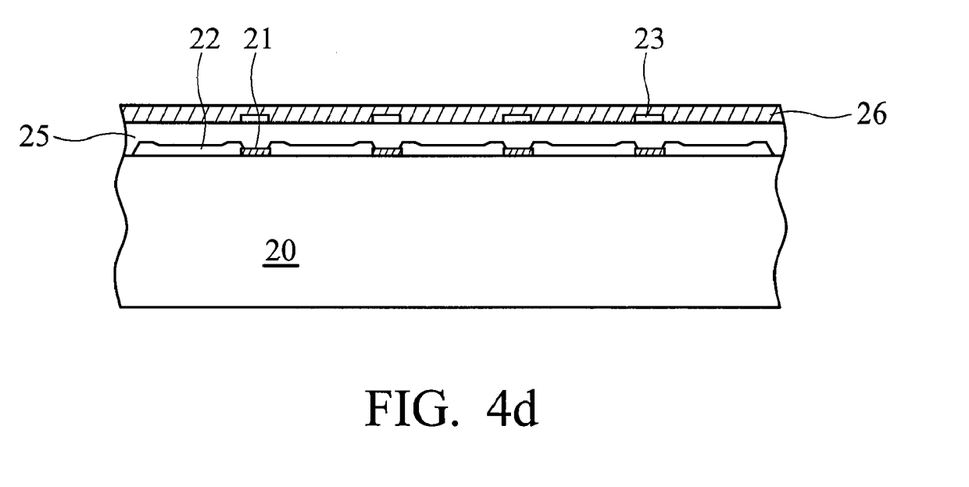
FIG. 4d is a schematic cross section showing formation of an electrode layer of a color filter according to a second embodiment of the present invention.

As shown in FIG. 4b, a planarization layer 25 is formed on the color filter units and both the light shielding layer 21 and color fitter units 22 are covered by the planarization layer 25. The planarization layer 25 can be a thermal curable photoresist or UV curable photoresist. As shown in FIG. 4c, a matrix array or parallel strips of the conductive layers 23 is disposed on the light shielding layer 21 by sputtering, evaporation, inkjet printing or electroless plating. As shown in FIG. 4d, an electrode layer 26 is formed overlying the substrate by sputtering or the like. Both the conductive layer 23 and the planarizatio layer 25 are covered by the electrode layer 26, wherein the conductive layer 23 is electrically connected to the electrode layer 26. Parallel connection resistance reduces conductive resistance thereof.

Third Embodiment

Here, unlike the second embodiment, formation of conductive layer 23 precedes formation of planarization layer 25. Thus at least one via hole is required in the planarization layer 25 to electrically connect the conductive layer 23 to the electrode layer 26.

Figure 5A:
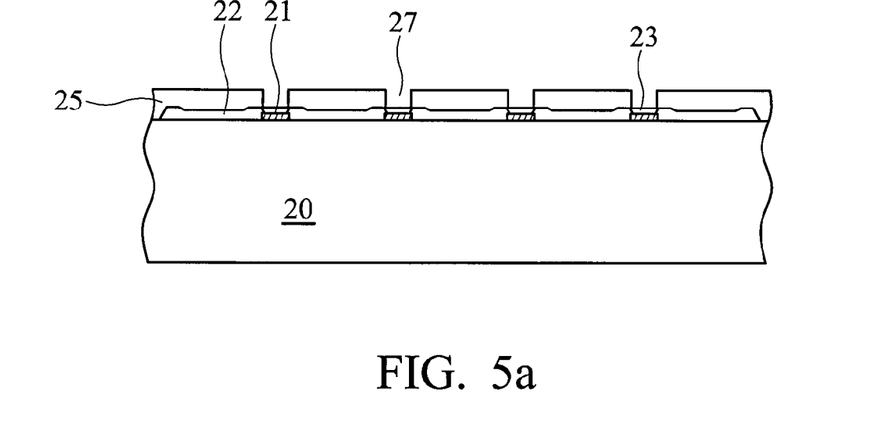
FIG. 5a is a schematic cross section showing formation of a planarization layer and a plurality of via holes of a color filter according to a third embodiment of the present invention.
Figure 5B:
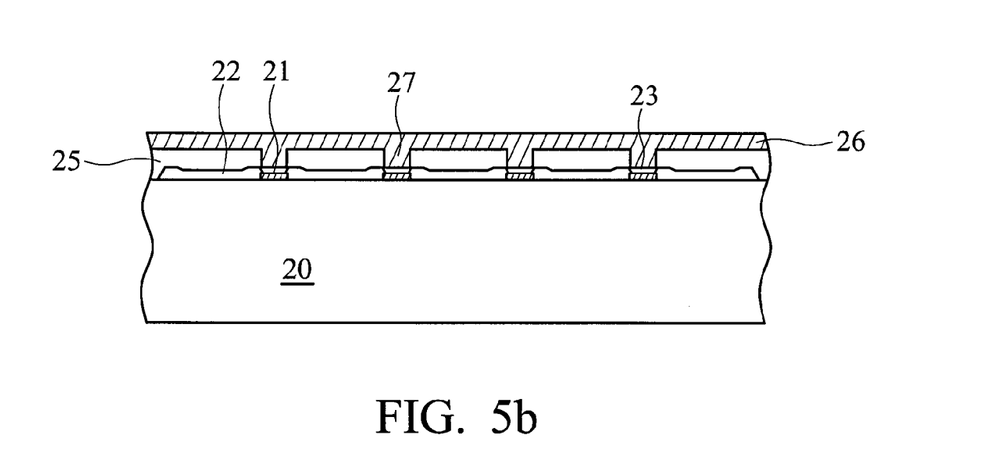
FIG. 5b is a schematic cross section showing formation of an electrode layer of a color filter according to a third embodiment of the present invention.

As shown in FIG. 3c, the light shielding layer 21, color filter units 22 and conductive layer 23 are formed according to the second embodiment. As shown in FIG. 5a, a planarization layer 25 is formed on all of the color filter units 22 and conductive layer 23. More than one via hole 27 is formed in the planarization layer 25 to expose the conductive layer 23 by photolithography and etching or maskless technique such as laser writing, EUV writing, electron-beam or ion-beam. Finally, as shown in FIG. 5b, an electrode layer 26 is formed overlying the substrate 20 by sputtering or the like. Both the planarization layer 25 and conductive layer 23 are covered by the electrode layer 26 to electrically connect the conductive layer 23 to the electrode layer 26 through the via hole 27. Parallel connection resistance reduces conductive resistance thereof.

Fourth Embodiment

Figure 6A:
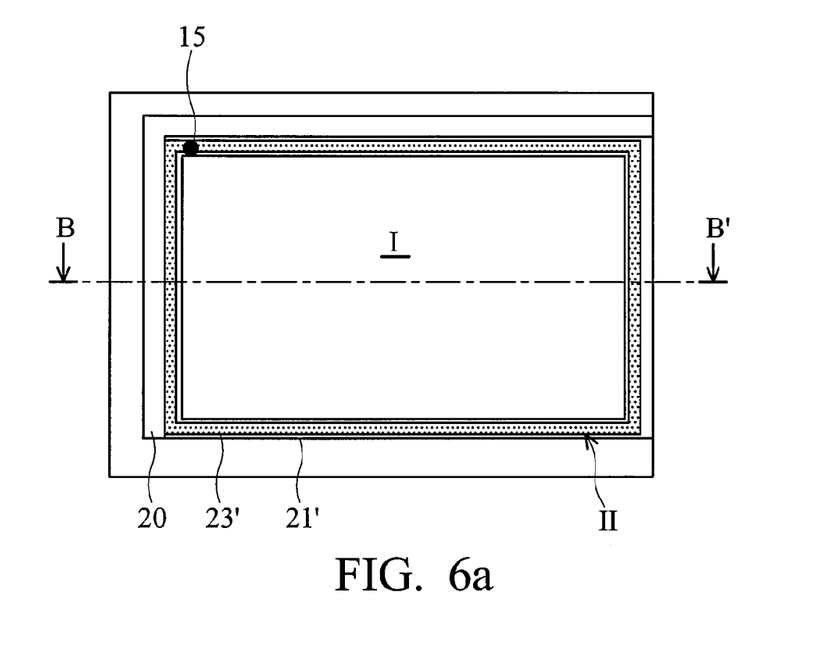
FIG. 6a is a schematic plan view of a color filter having a closed loop of conductive layer of the non-display area according to a fourth embodiment of the present invention.
Figure 6B:
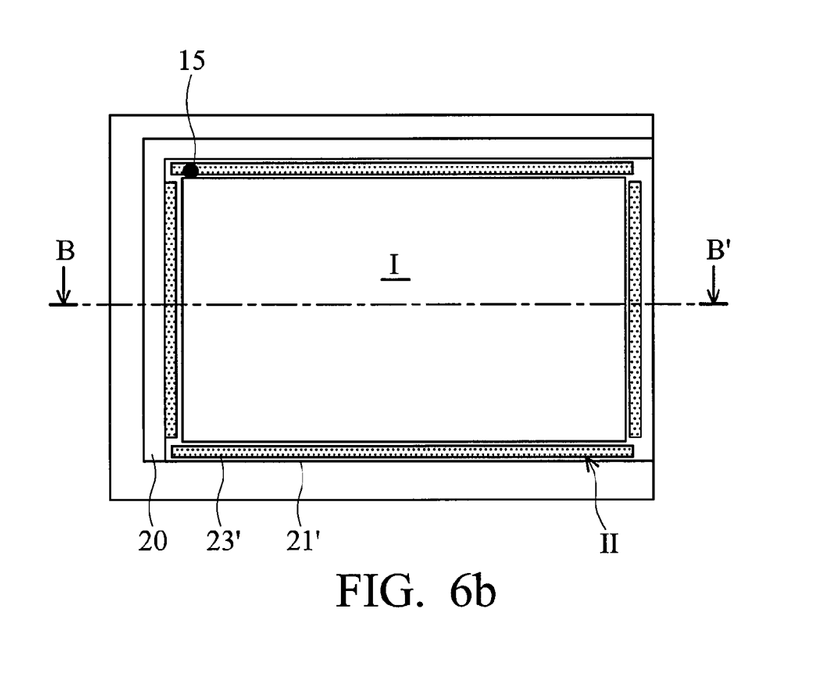
FIG. 6b is a schematic plan view of a color filter having discrete strips of conductive layer of the non-display area according to a fourth embodiment of the present invention.
Figure 7A:
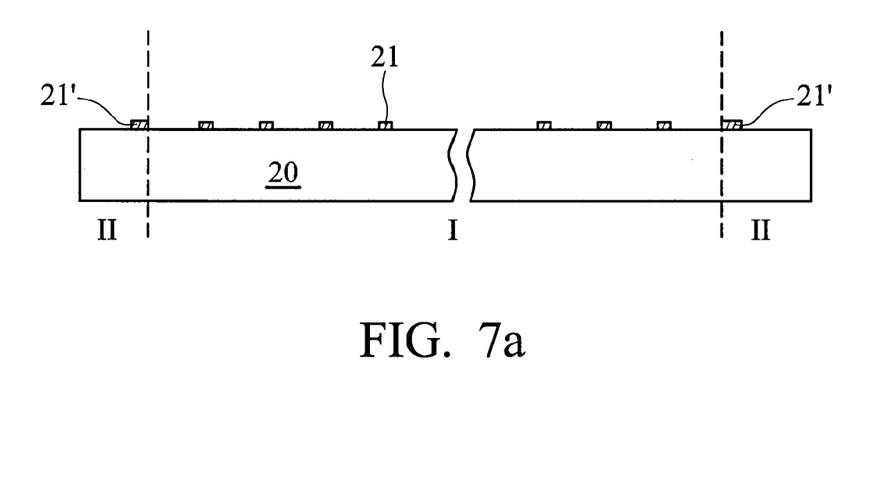
FIG. 7a-7c are schematic cross sections showing fabrication steps of a color filter according to a fourth embodiment of the present invention.
Figure 7B:
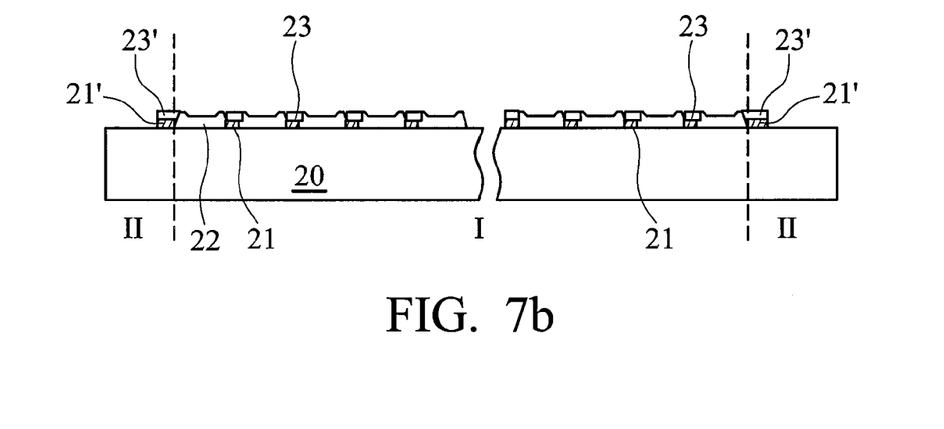
Figure 7C:
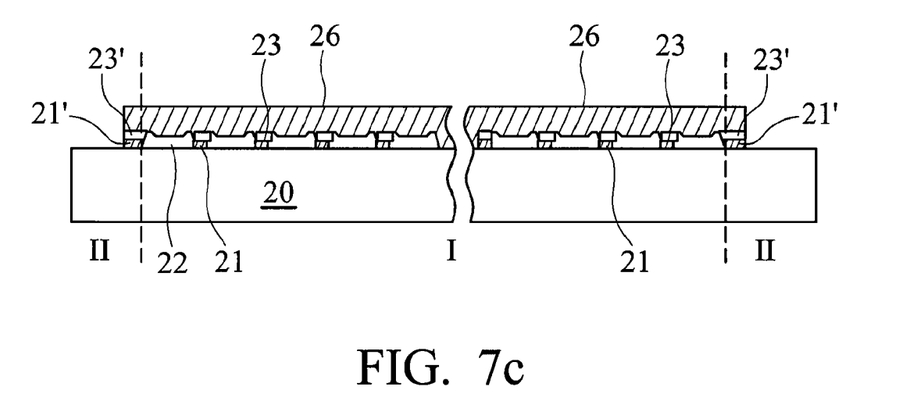

FIG. 7a is a cross section taken along line B-B' of FIG. 6a, providing a substrate 20 having a display area I and a non-display area II. A light shielding layer 21' is formed on the non-display area II of substrate 20 according to the first embodiment. Then, as shown in FIG. 7b, a conductive layer 23' is formed on the light shielding layer 21' of the non-display area II according to the first embodiment, wherein the conductive layer 23' of the non-display area II is in the form of a closed loop (as FIG. 6a) or discrete strips (as FIG. 6b) surrounding the periphery of display area I. Finally, as shown in FIG. 7c, an electrode layer 26 is formed overlying the substrate 20 according to the first embodiment and electrically connect to the conductive layer 23'.

Figure 7D:
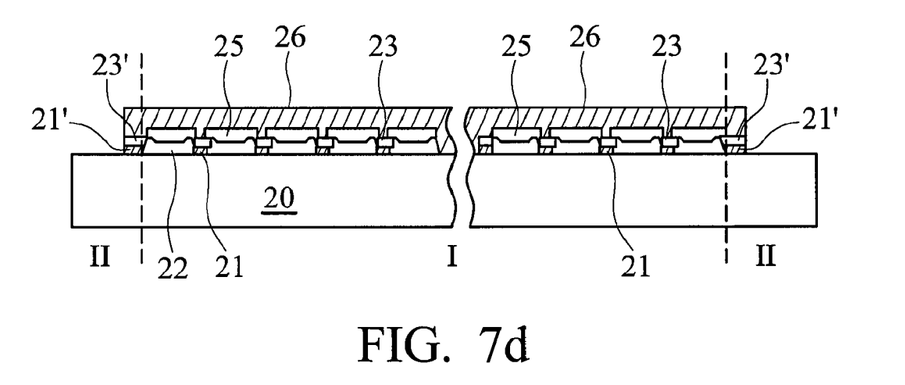
FIG. 7d is a schematic cross section showing formation of a planarization layer and a plurality of via holes of a color filter according to a third embodiment of the present invention.

According to the fourth embodiment of the invention, formation of planarization layer 25 can precede formation of electrode layer 26. As shown in FIG. 7a, a substrate 20 is provided, having a display area I and a non-display area II. A light shielding layer 21' is formed on the non-display area II of substrate 20 according to the previous embodiments. Before forming the electrode layer 26, as shown in FIG. 7d, a planarization layer 25 is formed on the light shielding layer 21 and conductive layer 23 of the display area I but not on the conductive layer 23' of the non-display area II. More than one via hole 27 is formed in the planarization layer 25 to expose portions of the conductive layer 23 by photolithography and etching or maskless technique such as laser writing, EUV writing, electron-beam or ion-beam. An electrode layer 26 is formed overlying the substrate 20 according to the previous embodiments to electrically connect the conductive layer 23 of display area I and the conductive layer 23' of non-display area II to the electrode layer 26.

Figure 7E:
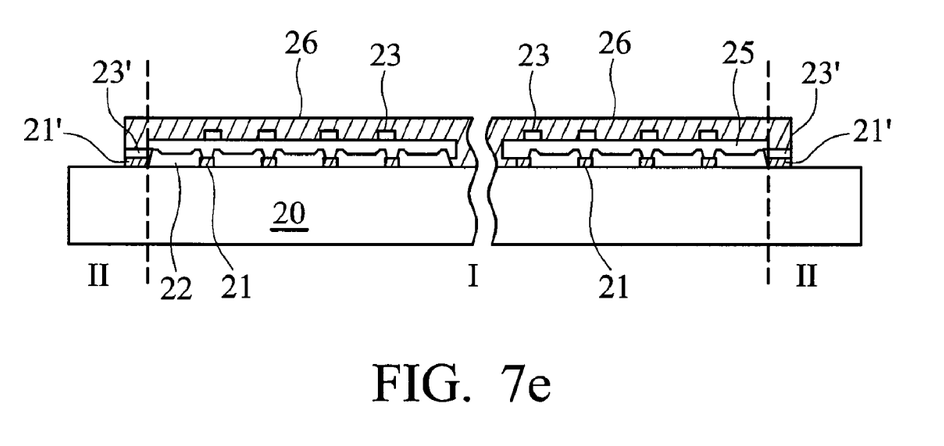
FIG. 7e is a schematic cross section showing formation of a planarization layer of a color filter according to a third embodiment of the present invention.

Planarization layer 25 can also be formed first on the color filter units 22 of the display area I. Then, as shown in FIG. 7e, conductive layers 23 and 23' are formed on the display area I and non-display area II according to the previous embodiments. Finally, an electrode layer 26 is formed overlying the substrate 20. Both the conductive layer 23 and the planarization layer 25 are covered by the electrode layer 26 to electrically connect the conductive layer 23 and 23' to the electrode layer 26.

In summary, the invention provides a color filter and a fabrication method thereof. One or more conductive layers are formed on a light shielding layer between color filter units to form a parallel structure conductive between the conductive layer and the electrode layer. Parallel connection resistance can reduce the conductive resistance thereof. Material of the electrode layer, such as ZnO:Sn, ZnO:V, ZnO:Co, ZnO:Al, ZnO:Ga, ZnO:Ti, ZnO:In or the like reduces costs and the number of Ag transfer pads 15 required. Further, a thinner electrode layer enhances transmission of the panel. The conductive layer can be Ag, Mo, Ti, Al, Cu, Cr, Pt, Mo/Al/Mo, Ti/Al/Ti or Al/Nb.

While the invention has been described by way of example and in terms of preferred embodiments, it is to be understood that the invention is not limited therefor. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating a color filter, comprising:
    providing a substrate having a display area and a non-display area;
    forming light shielding layers in the display area and the non-display area of the substrate;
    forming color filter units in the display area between the light shielding layers;
    forming a planarization layer overlying the light shielding layers and the color filter units;
    forming a first conductive layer over the light shielding layer in the non-display area and a second conductive layer on the planarization layer in the display area; and
    forming an electrode layer covering the first and second conductive layers and the planarization layer, and electrically connected to the first and second conductive layers.

2. The method as claimed in claim 1, wherein the planarization layer is formed over the light shielding layer before the step of forming the electrode layer.

* * * * *